(12) United States Patent  
Meltzer

(10) Patent No.: US 6,665,683 B1
(45) Date of Patent: Dec. 16, 2003

(54) SYSTEM AND METHOD FOR ADJUSTING A VALUE WITHIN A MULTIDIMENSIONAL AGGREGATION TREE

(75) Inventor: Andrew Meltzer, Mendota Heights, MN (US)

(73) Assignee: E. Intelligence, Inc., Edina, MN (US)

( * ) Notice: Subject to any disclaimer, the term of this patent is extended or adjusted under 35 U.S.C. 154(b) by 312 days.

(21) Appl. No.: 09/887,482

(22) Filed: Jun. 22, 2001

(51) Int. Cl.[7] .............................................. G06F 17/00
(52) U.S. Cl. ..................... 707/101; 707/102; 707/104.1
(58) Field of Search ................................ 707/101, 100, 707/102, 104.1, 8, 201; 711/152, 163; 710/200

(56) References Cited

U.S. PATENT DOCUMENTS 5,832,475 A * 11/1998 Agrawal et al. ................ 707/2
6,256,712 B1 * 7/2001 Challenger et al. ......... 711/141
6,374,249 B1 * 4/2002 Joslin et al. ................ 707/100

OTHER PUBLICATIONS

Mumick et al "Maintenance of data cubes and summary tables in a warehouse", ACM 1997, pp. 100–111.*
Kline et al "Computing temporal aggregates", IEEE 1995, pp. 222–231.*
Ye et al "Processing temporal aggregates over networked workstations", IEEE 1998, pp. 2513–2518.*
Dinter et al "The OLAP market: state of the art and research issues", ACM 1999, pp. 22–27.*

* cited by examiner

*Primary Examiner*—Uyen Le
(74) *Attorney, Agent, or Firm*—Schwegmen, Lundberg, Woessner & Kluth, P.A.

(57) ABSTRACT

A database system and method for adjusting a value within a database configured as a multidimensional aggregation tree (MAT) having a plurality of leaves. A value associated with a vertex within the MAT is modified, propagated down toward the leaves of the MAT and reconciled up through the tree from the leaf to determine if there is a locked vertex. If there is a locked vertex, a value is adjusted down toward the leaves from the locked vertex, wherein adjusting down includes computing a value for a leaf associated with the locked vertex.

12 Claims, 5 Drawing Sheets

SYSTEM AND METHOD FOR ADJUSTING A VALUE WITHIN A MULTIDIMENSIONAL AGGREGATION TREE

FIELD OF THE INVENTION

The present invention relates generally to data analysis, and more particularly to a system and method for manipulating values within multi-dimensional databases.

BACKGROUND INFORMATION

Businesses generally can be modeled as a set of hierarchies. For example, their market might be divided into multiple regions; each region might be further divided into districts. The districts may include two or more cities. Each city might be further subdivided into a number of sales people.

Products are more obviously divided. The products sold by a company might include soft drinks and snacks. The snacks might be divided into potato chips, pretzels, etc.; the potato chips might include ridged potato chips and non-ridged potato chips.

To be useful, decision support systems must support analysis based not only on historical data but also on projections for future activities. For instance, marketing may project sales for the next three months. These figures may then be introduced into a model used to tune manufacturing output over that period of time.

Business users want to be able make forecasts anywhere within the context of their business hierarchies. The business may want sales people entering projected sales; it may want district managers reviewing and changing that data at the district product group level; and it may want financial people reviewing and modifying data across a region, across multiple regions, or across the country.

Multidimensional analysis allows users to select, summarize, calculate, format and report by dimensions and by attributes within dimensions. It can be used to support virtually any time-series decision support application, including reporting, analysis, forecasting and budgeting.

Typically, changes made at any level must propagate up and down the hierarchies dynamically so that anyone who wants to do some analysis can make a change and look to see what the impact of that change was. In addition to those changes, the users might need to lock some values. For example, if there were capacity limits one might want to lock a value at the capacity limit so that nothing went beyond that.

To date, much of this analysis has been weak and performed using multidimensional databases having fixed hierarchical positions. What is needed is a system and method for adjusting values within multiple drillable hierarchies, while allowing both dynamic aggregation and disaggregation, with locked values, within an OLAP framework.

SUMMARY OF THE INVENTION

The present invention is a system and method of adjusting a value within a database configured as a multidimensional aggregation tree (MAT) having a plurality of leaves. A value associated with a vertex within the MAT is modified, propagated down toward the leaves of the MAT and reconciled up through the tree from the leaf to determine if there is a locked vertex. If there is a locked vertex, a value is adjusted down toward the leaves from the locked vertex, wherein adjusting down includes computing a value for a leaf associated with the locked vertex.

According to another aspect of the present invention, a system and method of adjusting a value within a database configured as a multidimensional aggregation tree (MAT) having a plurality of leaves includes modifying a value associated with a vertex, adjusting down toward the leaves of the MAT, wherein adjusting down includes computing a value for a leaf associated with the modified vertex and reconciling up through the tree from the leaf to determine if there is a locked vertex. If there is a locked vertex, the method includes adjusting down toward the leaves from the locked vertex, wherein adjusting down includes computing a value for a leaf associated with the locked vertex, and propagating the values computed for the leaves up the tree.

According to yet another aspect of the present invention, a system and method of reporting data stored within a data warehouse includes providing a computer with server and a memory device, storing a database in the memory device, wherein the database includes a plurality of data entries, extracting a subset of data entries from the database, storing the subset of data entries on the server, modifying the data entries stored on the server in response to user commands, propagating the modifications in order to form a multidimensional aggregation tree (MAT), reading data from the modified data entries stored on the server and displaying the data to the user.

According to yet another aspect of the present invention, a database system includes a data warehouse and a computer connected to the data warehouse. The computer adjusts a value associated with a first vertex within a multidimensional aggregation tree (MAT), wherein the MAT includes a plurality of leaves attached to vertices. Adjusting includes adjusting down from the first vertex toward the leaves of the MAT, wherein adjusting down includes computing a value for a leaf associated with the vertex, reconciling up through the tree from the leaf to determine if there is a locked vertex and if there is a locked vertex, adjusting down toward the leaves from the locked vertex, wherein adjusting down includes computing a value for a leaf associated with the locked vertex.

BRIEF DESCRIPTION OF THE DRAWINGS

In the drawings, where like numerals refer to like components throughout the several views.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

Figure 1:
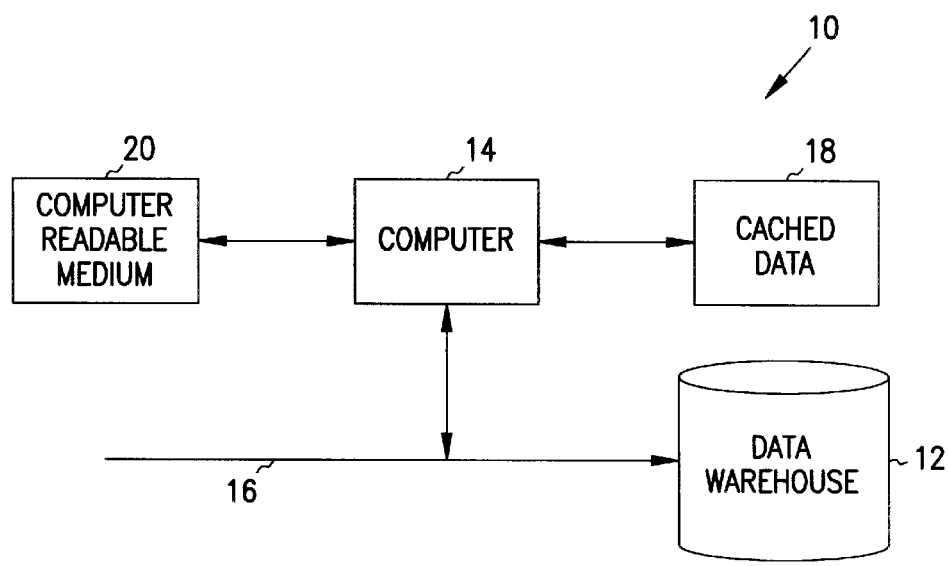
FIG. 1 shows a database system according to the present invention.

A database system 10 is shown in FIG. 1. In the system of FIG. 1, a data warehouse 12 stores data pertaining to a business. A computer 14 communicates with data warehouse 12 across a communications link 16 (such as a network or telephone line) in order to analyze the data stored in data warehouse 12, or to manipulate that data for reporting, forecasting or budgeting.

In the embodiment shown in FIG. 1, a subset of data is extracted from data warehouse 12 and stored as cached data 18, where it can be used to generate reports, or for analysis and forecasting before being saved out to data warehouse 12.

In database systems, an aggregation tree is a tree with the following properties:
1) A leaf node contains some data; and
2) A non-leaf node contains a value based on an invertible function of the data of its children. A locked node is a node in an aggregation tree whose value has been constrained so that it may not be modified. (It is also called a lock.)

A multidimensional Aggregation Tree (MAT) is the Cartesian product of aggregation trees. For example, a k-dimensional MAT (k-MAT) is the Cartesian product of k aggregation trees. A MAT forms a lattice.

When the value associated with a vertex in a Multidimensional Aggregation Tree is changed, the tree is no longer a MAT. To become a MAT again, the values associated with a number of related vertices must be modified. The problem is to quickly, efficiently, and with small asymptotic complexity, change only those vertices (nodes) whose values must be modified so that the tree once again becomes a Multidimensional Aggregation Tree. This must be done while leaving the value of the modified vertex alone. In one embodiment, any node (except a locked node) is a candidate for modification. This transformation must occur in any tree in the presence of locks.

To accomplish this, in one embodiment, an algorithm executes in computer 14 to propagate a value associated with a vertex downward to its children while maintaining the value at the vertex. In addition, it is possible that a change to the value of a vertex will cause the tree to enter a state in which it can no longer become a MAT. In one embodiment, the algorithm detects these situations by finding itself in an inconsistent state from which it cannot recover. An example is if the value of a non-negative vertex must become negative. In one embodiment, the system recovers by reinstating the initial values and returning an error status.

Figure 2:
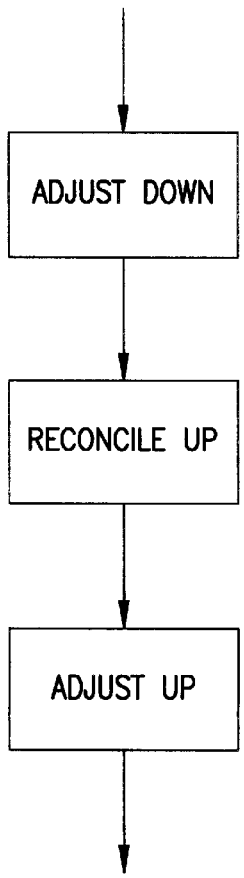
FIG. 2 shows a method of adjusting a value within a multidimensional aggregation tree.

One method of adjusting a value within a multidimensional aggregation tree to accomplish this is shown in FIG. 2. In the flowchart of FIG. 2, the above problem is resolved in three phases. The first phase is called AdjustDown. The second phase is called ReconcileUp. The final phase is called AdjustUp.

AdjustDown recursively adjusts down (toward the leaves of) the k-MAT from one vertex to another. When it reaches a leaf in any dimension, it moves to the next dimension and continues from there, passing its children information about how to correctly modify its value.

When AdjustDown reaches a leaf of the k-MAT, it computes the value of the leaf node, including taking care of any rounding issues. It then adds the modified vertex to the list of changed vertices.

In the lattice making up the k-MAT, there may be many paths between two vertices. If there is a lock on any path between an ancestor and its descendent, the descendent must be changed. AdjustDown detects these locks and only adjusts the appropriate descendants.

The ReconcileUp phase ensures that all upward adjustments can be resolved through existing locks. ReconcileUp walks up the tree recursively through the k dimensions and the vertices. If it encounters a lock, it re-invokes AdjustDown, this time using the siblings of the locked vertex with values adjusted based on the lock. When AdjustDown completes, the portion of the graph processed by ReconcileUp need not be recomputed. ReconcileUp continues its recursive walk up the tree and across the dimensions.

If ReconcileUp encounters a non-locked node, it computes the new correct value to ensure it is possible (it is possible that the new value may violate some rule based on the defined operation.) If it is possible, the recursion continues.

AdjustUp takes the final modifications as computed by AdjustDown and ReconcileUp and applies them to the vertices in the graph. It works from leaf-nodes toward the root, working with a single change at a time. It walks up the k dimensions and the vertices of the graph recursively, visiting every parent node in a non-locked path to the root and updating its value.

An editable multidimensional OLAP structure with k drillable dimensions and locked values can be represented graphically. The graph that represents the structure is a k-MAT. Changing values within this structure (for example changing the expected sales of Sprockets in Boston in February by Penelope) causes the resulting tree to no longer consistently represent the hierarchical nature of the data; in other words, the resulting tree is no longer a MAT.

Computer 14 can be used to return the OLAP structure to a state in which the hierarchical nature of the data is accurately represented.

Figure 3:
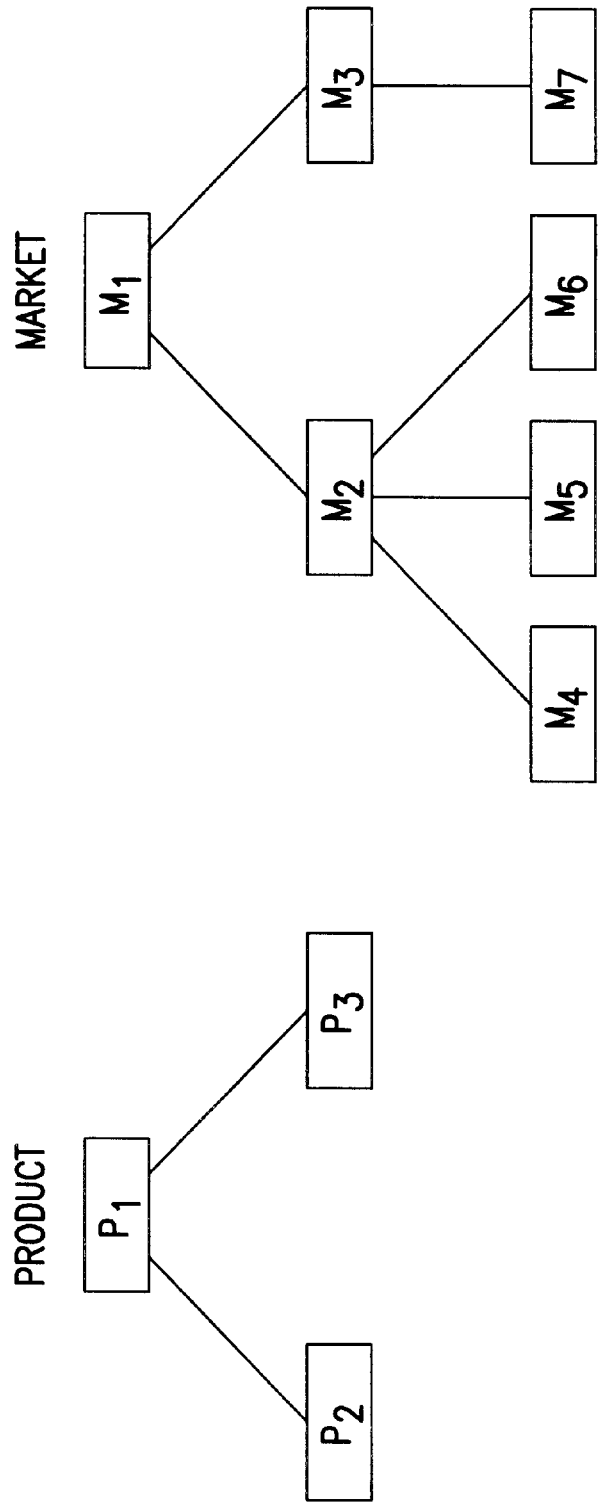
FIG. 3 shows a pair of aggregation trees.
Figure 4:
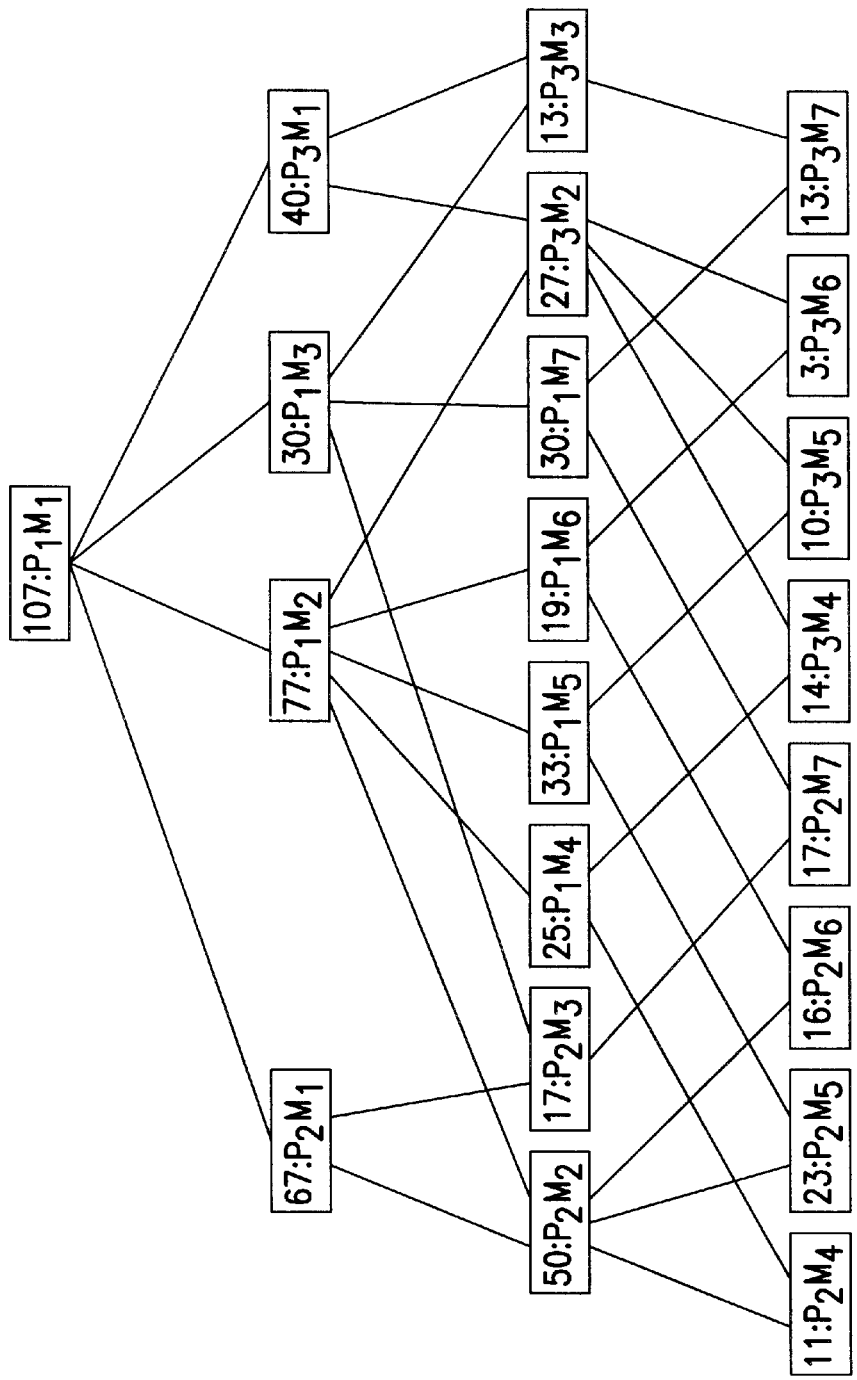
FIG. 4 shows a 2-MAT formed from the aggregation trees of FIG. 3.

The above method of adjusting a value within a multidimensional aggregation tree will be applied to a 2-MAT. One such 2-MAT is shown in FIG. 4. The 2-MAT of FIG. 4 is formed from the pair of aggregation trees (Product and Market) shown in FIG. 3. The Product aggregation tree includes a product P1 with two subproducts P2 and P3. The Market aggregation tree includes three levels of market identification (M1:M7).

The 2-MAT of FIG. 4 includes a locked vertex $P_1M_2$.

Figure 5:
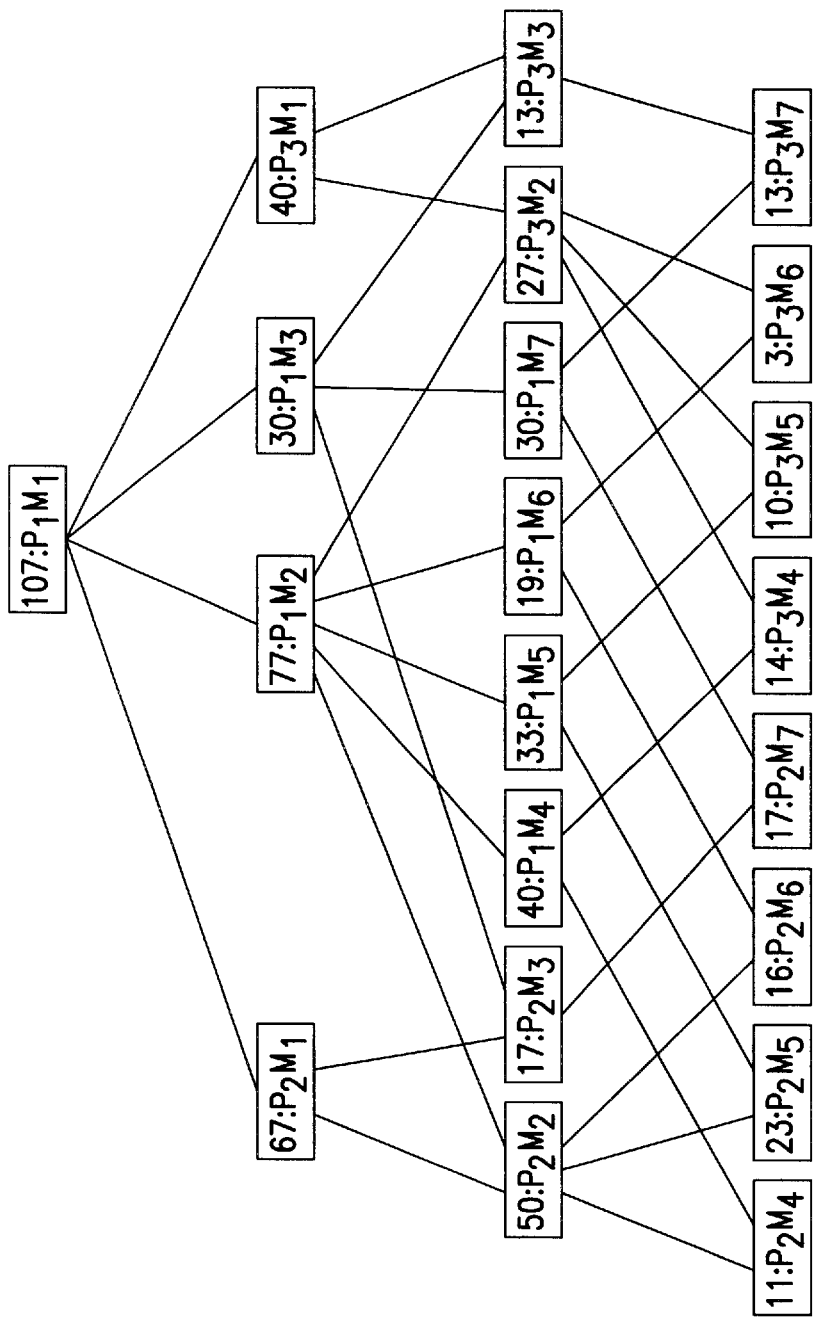
FIG. 5 shows a lattice resulting from modification of a value associated with one of the vertices of FIG. 4.

In the example shown, vertex $P_1M_4$ is modified from its initial value of 25 to a new value of 40 (see FIG. 5). As noted above, when the value associated with a vertex in a Multi-dimensional Aggregation Tree is changed, the tree is no longer a MAT. To become a MAT again, the values associated with a number of related vertices must be modified.

Figure 6:
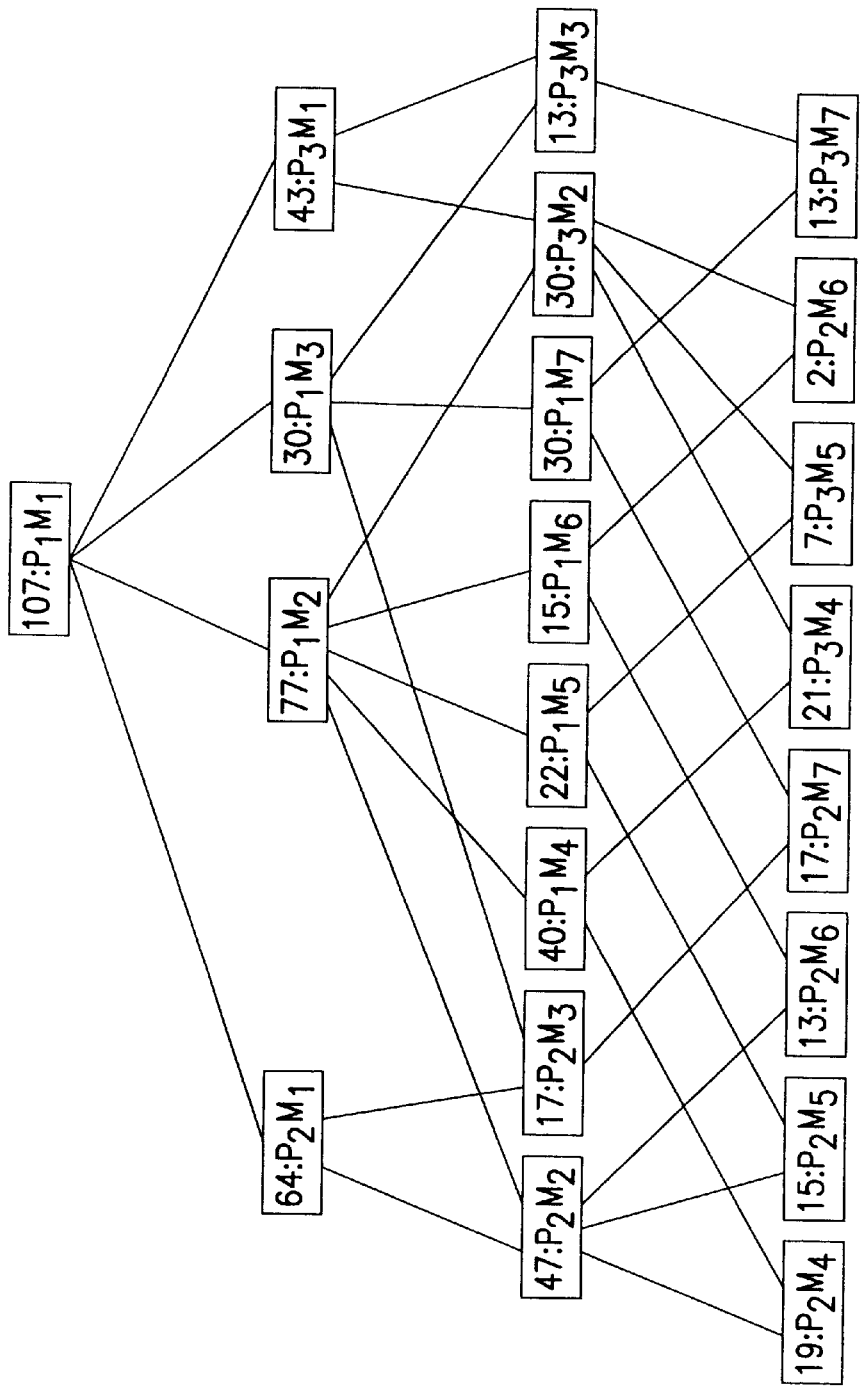
FIG. 6 shows a 2-MAT formed by applying the methods of the present invention.

In order to return this graph to a 2-MAT, the values associated with most of the vertices must be modified (using the AdjustDown, ReconcileUp, and AdjustUp modifications described above) to yield the graph shown in FIG. 6. (Note: There is rarely a single unique set of modifications that will satisfy the 2-MAT invariant.)

The system and method for adjusting a value within a multidimensional aggregation tree described above allows users to perform forecasting, analysis, budgeting and reporting real time within a spreadsheet looking application. An algorithm executing in computer 14 propagates a value associated with a vertex downward to its children while maintaining the value at the vertex. In one embodiment, only those vertices whose values must be modified so that the tree once again becomes a Multidimensional Aggregation Tree are changed. This is done while leaving the value of the modified vertex alone and in the presence of locks. The above described method can be implemented in program code stored on computer readable medium 20 and readable by computer 14.

In the above discussion and in the attached appendices, the term "computer" is defined to include any digital or analog data processing unit. Examples include any personal computer, workstation, set top box, mainframe, server, supercomputer, laptop or personal digital assistant capable of embodying the inventions described herein.

Examples of articles comprising computer readable media are floppy disks, hard drives, CD-ROM or DVD media or any other read-write or read-only memory device. Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. A method of adjusting a value within a multidimensional aggregation tree (MAT) having a plurality of leaves, comprising:

modifying a value associated with a vertex;

adjusting down toward the leaves of the MAT, wherein adjusting down includes computing a value for a leaf associated with the vertex;

reconciling up through the tree from the leaf to determine if there is a locked vertex; and if there is a locked vertex, adjusting down toward the leaves from the locked vertex, wherein adjusting down includes computing a value for a leaf associated with the locked vertex.

2. The method of claim 1, wherein adjusting down includes detecting a locked vertex along a path to a leaf.

3. An article comprising a computer readable medium having instructions thereon, wherein the instructions, when executed in a computer, create a system for executing the method of claim 1.

4. A method of adjusting a value within a multidimensional aggregation tree (MAT) having a plurality of leaves, comprising:

modifying a value associated with a vertex;

adjusting down toward the leaves of the MAT, wherein adjusting down includes computing a value for a leaf associated with the modified vertex;

reconciling up through the tree from the leaf to determine if there is a locked vertex;

if there is a locked vertex, adjusting down toward the leaves from the locked vertex, wherein adjusting down includes computing a value for a leaf associated with the locked vertex; and propagating the values computed for the leaves up the tree.

5. The method of claim 4, wherein the method further comprises creating a list of changed vertices.

6. The method of claim 4, wherein reconciling includes determining if all upward adjustments can be resolved through existing locks and generating an error message if an upward adjustment cannot be resolved through existing locks.

7. The method of claim 4, wherein adjusting down includes detecting a locked vertex along a path to a leaf.

8. An article comprising a computer readable medium having instructions thereon, wherein the instructions, when executed in a computer, create a system for executing the method of claim 4.

9. A method of reporting data stored within a data warehouse, the method comprising the steps of:

providing a computer with server and a memory device;

storing a database in the memory device, wherein the database includes a plurality of data entries;

extracting a subset of data entries from the database;

storing the subset of data entries on the server;

modifying the data entries stored on the server in response to user commands;

propagating the modifications in order to form a multi-dimensional aggregation tree (MAT);

reading data from the modified data entries stored on the server; and displaying the data to the user.

10. An article comprising a computer readable medium having instructions thereon, wherein the instructions, when executed in a computer, create a system for executing the method of claim 9.

11. A database system, comprising:

a data warehouse; and a computer connected to the data warehouse;

wherein the computer adjusts a value associated with a first vertex within a multidimensional aggregation tree (MAT), wherein the MAT includes a plurality of leaves attached to vertices and wherein adjusting includes:

adjusting down from the first vertex toward the leaves of the MAT, wherein adjusting down includes computing a value for a leaf associated with the vertex;

reconciling up through the tree from the leaf to determine if there is a locked vertex; and if there is a locked vertex, adjusting down toward the leaves from the locked vertex, wherein adjusting down includes computing a value for a leaf associated with the locked vertex.

12. The database system of claim 11, wherein the computer includes memory for storing cached data representing a subset of data stored within the data warehouse.

* * * * *

UNITED STATES PATENT AND TRADEMARK OFFICE
CERTIFICATE OF CORRECTION

PATENT NO. : 6,665,683 B1
DATED : December 16, 2003
INVENTOR(S) : Meltzer

It is certified that error appears in the above-identified patent and that said Letters Patent is hereby corrected as shown below:

<u>Title page,</u>
Item [56], References Cited, OTHER PUBLICATIONS, after "Mumick et al" insert -- ., --; after "Kline et al" insert -- ., --; after "Ye et al" insert -- ., --; and after "Dinter et al" insert -- ., --.
Item [74], *Attorney, Agent, or Firm*, delete "Schwegmen" and insert -- Schwegman --, therefor.

Signed and Sealed this

Thirteenth Day of April, 2004

JON W. DUDAS
*Acting Director of the United States Patent and Trademark Office*